United States Patent
Westhues et al.

(10) Patent No.: US 10,234,966 B1
(45) Date of Patent: Mar. 19, 2019

(54) ELECTROSTATIC AND WIRED ELECTRICAL CONNECTOR FOR STYLUS

(71) Applicant: Microsoft Technology Licensing, LLC, Redmond, WA (US)

(72) Inventors: Jonathan Westhues, Portland, OR (US); Steven N. Bathiche, Kirkland, WA (US); Denis V. Varlamov, Portland, OR (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/683,588

(22) Filed: Aug. 22, 2017

(51) Int. Cl.
G06F 3/0354 (2013.01)
G06F 3/044 (2006.01)
G02F 1/03 (2006.01)
G06F 3/038 (2013.01)

(52) U.S. Cl.
CPC ........ *G06F 3/03545* (2013.01); *G02F 1/0316* (2013.01); *G06F 3/0383* (2013.01); *G06F 3/044* (2013.01)

(58) Field of Classification Search
CPC .... G06F 3/03545; G06F 3/044; G06F 3/0383; G02F 1/0316
See application file for complete search history.

(56) References Cited

U.S. PATENT DOCUMENTS

| | | | |
|---|---|---|---|
| 9,213,424 B1 | 12/2015 | Dunn | |
| 9,329,703 B2 | 5/2016 | Falkenburg et al. | |
| 9,582,105 B2 | 2/2017 | Krah et al. | |
| 9,766,724 B2 * | 9/2017 | Feng | G06F 3/03545 |
| 2006/0197755 A1 * | 9/2006 | Bawany | G06F 1/266 345/179 |
| 2009/0153525 A1 | 6/2009 | Chang | |
| 2011/0279081 A1 | 11/2011 | Cacioppo et al. | |
| 2014/0002422 A1 | 1/2014 | Stern et al. | |
| 2014/0028635 A1 | 1/2014 | Krah | |
| 2014/0198082 A1 * | 7/2014 | Mori | G06F 3/03545 345/179 |

(Continued)

FOREIGN PATENT DOCUMENTS

WO   WO 2017044216 A1   3/2017

OTHER PUBLICATIONS

"International Search Report and Written Opinion Issued in PCT Application No. PCT/US2018/038698", dated Sep. 11, 2018, 12 pages.

*Primary Examiner* — Peter D McLoone
(74) *Attorney, Agent, or Firm* — Alleman Hall Creasman & Tuttle LLP

(57) ABSTRACT

An active stylus includes a body, an electrical connector operatively coupled to the body, wired connection circuitry contained within the body and electrically coupled to the electrical connector, and electrostatic circuitry contained within the body and electrically coupled to the electrical connector. The electrical connector is configured to electrically couple the active stylus with a device via a wired connection. The wired connection circuitry is configured to hold at least a portion of the electrical connector at ground when the active stylus is operating in a wired connection mode. The electrostatic circuitry is configured to transmit, via the electrical connector, one or more excitation waveforms when the active stylus is operating in an electrostatic mode.

20 Claims, 4 Drawing Sheets

(56) References Cited

U.S. PATENT DOCUMENTS

| | | | |
|---|---|---|---|
| 2015/0015547 A1* | 1/2015 | Lin | G06F 3/03545 345/179 |
| 2015/0378455 A1 | 12/2015 | Immel et al. | |
| 2016/0124528 A1* | 5/2016 | Feng | G06F 3/03545 345/179 |
| 2017/0068339 A1* | 3/2017 | Zimmerman | G06F 3/0383 |
| 2017/0068341 A1 | 3/2017 | Zimmerman et al. | |
| 2017/0177098 A1* | 6/2017 | Chang | G06F 3/03545 |
| 2017/0315631 A1* | 11/2017 | Pourbigharaz | G06F 3/03545 |
| 2018/0188833 A1* | 7/2018 | Wierenga | G06F 3/044 |

* cited by examiner

ELECTROSTATIC AND WIRED ELECTRICAL CONNECTOR FOR STYLUS

BACKGROUND

Touch-sensitive display devices, track pads, writing tablets, graphics tablets/digitizers, and other electronic devices may accept input from an input device, such as a stylus. A stylus may be more suitable for precision tasks, such as drawing, writing, selecting icons, etc., than a finger or other blunt input mechanism. A stylus may include transmission/receiving mechanisms and/or otherwise be capable of performing active functions to interact with a device.

DETAILED DESCRIPTION

Figure 1:
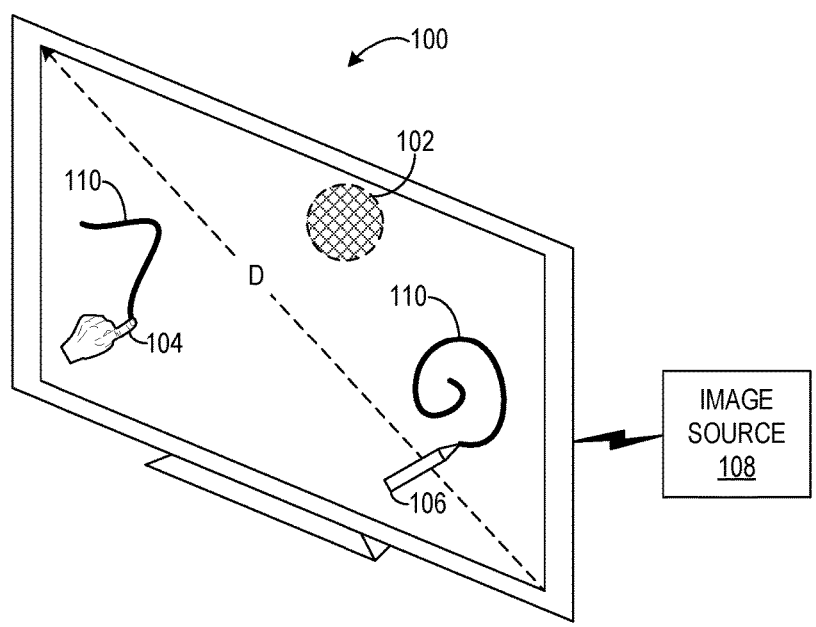
FIG. 1 shows an example touch-sensitive display system.

Active styluses may include one or more electrodes configured to capacitively couple with one or more electrodes of a capacitive touch sensor of a touch-sensitive display device, for example to provide input to the touch-sensitive display device. In some configurations, an active stylus may include an electrode tip that mimics an ink pen, and the electrode tip may be used to facilitate digital "inking" for visual display on the touch-sensitive display device.

Some active styluses include an electrical connector (e.g., a micro USB plug) configured to form a "wired" electrical connection with a device. For example, an active stylus can be plugged into a device, via the electrical connector, to receive charging current to recharge a battery of the active stylus. In another example, an active stylus can be plugged into a device, via the electrical connector, to transfer data (e.g., pairing information, updated firmware) between the active stylus and the device.

Typically, the "inking" electrode is positioned on one end of the active stylus, and the electrical connector is positioned on an opposing "non-inking" or tail end. In such an arrangement, the placement of the electrical connector on the tail end typically will prevent a separate "eraser" electrode from being co-located on the tail end. Accordingly, in the typical case, the stylus lacks erase or other capacitance-enabled electrode functionality on its tail end.

Accordingly, the present description is directed to an active stylus that includes a dual-purpose electrical connector that alternately provides wired connection functionality and electrostatic functionality, for example depending on the operational mode, state, etc. of the active stylus. In some examples, when the active stylus is operating in a wired connection mode, a housing of the electrical connector is held at ground. As used herein, "ground" refers to a designated reference voltage from which other system voltages are measured. In practice, ground may be set to any suitable reference voltage. By grounding the housing of the electrical connector when the active stylus is operating in the wired connection mode, the electrical connector can facilitate operation via a wired electrical connection with a device, enabling the active stylus to perform various operations in conjunction with the device. For example, data can be transferred between the active stylus and the device and/or the active stylus can receive charging current to power/charge the active stylus.

On the other hand, when the active stylus is operating in an electrostatic mode, the electrical connector may be floated—i.e., not maintained at ground, such that the electrical connector can be used to transmit/receive one or more excitation waveforms. For example, such excitation waveforms may create a capacitive coupling with electrodes of a proximate touch-sensitive device, thereby enabling touch input or other electrostatic interaction. In a particular example, when the active stylus is operating in the electrostatic mode, the electrical connector can be used to provide eraser functionality for a touch-sensitive display device.

By using the electrical connector in a dual-purpose manner to provide different functionality when the active stylus operates in different modes, the overall functionality of the active stylus may be enhanced.

FIG. 1 shows a touch-sensitive display system 100 including a touch sensor 102. In some examples, touch-sensitive display system 100 may be a large-format display device with a diagonal dimension D greater than 1 meter, for example, though the display may assume any suitable size. Touch-sensitive display system 100 may be configured to sense one or more sources of input, such as touch input imparted via a finger 104 of a user and/or input supplied by an input device 106, shown in FIG. 1 as an active stylus. The finger 104 and the active stylus 106 are provided as non-limiting examples and any other suitable source of input may be used in connection with touch-sensitive display system 100. The touch-sensitive display system 100 may be configured to receive input from input devices in contact with the touch-sensitive display system 100 and input devices not in contact with the touch-sensitive display system 100 (e.g., input devices that hover proximate to a surface of the display). "Touch input" as used herein refers to both types of input. In some examples, the touch-sensitive display system 100 may be configured to receive input from two or more sources simultaneously, in which case, the display system may be referred to as a multi-touch display system.

The touch-sensitive display system 100 may be operatively coupled to an image source 108, which may be, for example, a computing device external to, or housed within, the touch-sensitive display system 100. The image source 108 may receive input from the touch-sensitive display system 100, process the input, and in response generate appropriate graphical output 110 for the display system 100. In this way, the touch-sensitive display system 100 may provide a natural paradigm for interacting with a computing device that can respond appropriately to touch input.

The touch-sensitive display system 100 is an example of a device that the active stylus 106 may interact with via a wired connection and/or a capacitive coupling between electrodes of the active stylus 106 and electrodes of the capacitive touch sensor 102 of the touch-sensitive display system 100.

Figure 2:
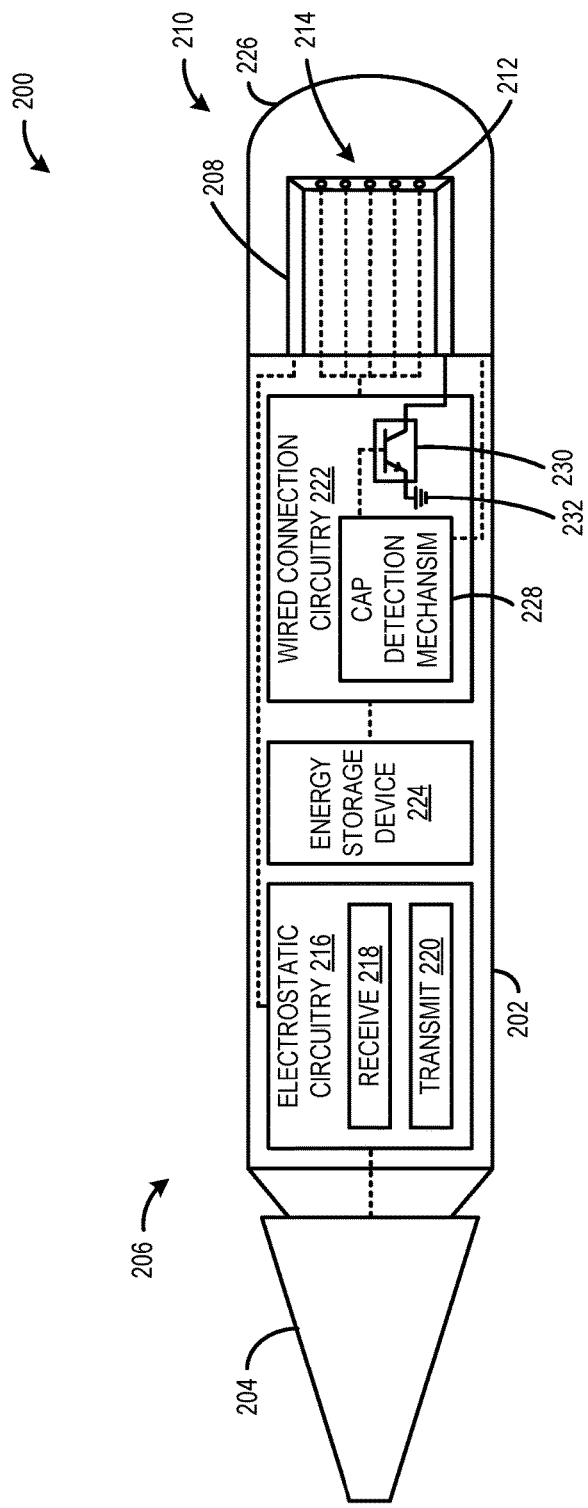
FIG. 2 schematically shows an example active stylus including an electrical connector.

FIG. 2 schematically shows an example active stylus 200 in simplified form. The active stylus 200 is usable with a device, such as the touch-sensitive display system 100 of FIG. 1. The active stylus 200 includes a body 202 configured to be gripped by a hand of a user. The body 202 is elongate and cylindrical, although other body shapes may be contemplated. The active stylus 200 includes an electrode tip 204 operatively coupled to an "inking" or front end 206 of the body 202. The active stylus 200 further includes an electrical connector 208 operatively coupled to a "non-inking" or tail end 210 of the body 202.

As discussed above, the electrical connector 208 may serve dual purposes for the active stylus 200. The electrical connector 208 is configured to form a wired connection with a device, for example when the active stylus 200 is operating in a wired connection mode. Further, the electrical connector 208 is configured to act as an electrode that facilitates electrostatic interaction when the active stylus 200 is operating in an electrostatic mode. For example, the electrical connector 208 can be driven with excitation waveform(s) such that, when another electrode of a device is sufficiently close, that other electrode's charge accumulation/state is influenced by the excitation waveform, thereby causing the excitation waveform to be "transmitted" to the device. Likewise, the electrical connector 208 may "receive" excitation waveforms via a capacitive coupling with an electrode of a device in a similar, but reversed manner.

The electrical connector 208 is configured to electrically couple the active stylus 200 with a device by forming a wired connection with the device, e.g., via physical and electrical characteristics of one of the existing USB standards. The electrical connector 208 may be configured to form a wired connection with any suitable type of device. For example, the electrical connector 208 may be configured to form a wired connection with a computing device, a power source (e.g., battery charger, electrical socket), a combination thereof, and/or another type of device. Moreover, the electrical connector 208 may form any suitable wired connection with a device. In one example, the electrical connector 208 may be plugged into a socket of a device. In another example, the electrical connector 208 may be plugged into an intermediate electrical cable that is further plugged into a device. In some implementations, the electrical connector 208 may take the form of a socket into which a plug of a device may be inserted to form a wired connection.

In the illustrated implementation, the electrical connector 208 includes a housing 212 and a plurality of conductors (e.g., pins) 214 positioned within the housing 212. The different conductors 214 may facilitate different electrical connections that provide different functionality. For example, different conductors 214 may be designated for power, ground, and data transfer. When a wired connection is formed between the electrical connector 208 and a device, the plurality of conductors 214 electrically couple to corresponding electrical contacts of a socket of the device, thereby electrically coupling the active stylus 200 with the device.

The electrical connector 208 may take any suitable form. The electrical connector 208 may conform to any suitable power connection standard for receiving charging current to power the active stylus 200. The electrical connector 208 may be configured to communicate with a device using any suitable communication protocol. For example, the electrical connector 208 may be a universal serial bus (USB) connector as indicated above, a Lightning connector, or any other type of electrical connector. The electrical connector 208 may be concealed by a removable cap 226 while the removable cap 226 is installed, as in the illustrated implementation.

The active stylus 200 includes electrostatic circuitry 216 contained within the body 202 and electrically coupled to the electrode tip 204 and the electrical connector 208. In some examples, the housing 212 may be conductive, and the electrostatic circuitry 216 may be electrically coupled to the housing 212 of the electrical connector 208. In some examples, the electrostatic circuitry 216 may be electrically coupled to the plurality of conductors 214 of the electrical connector 208. In some examples, the electrostatic circuitry 216 may be electrically coupled to the housing 212 and the plurality of conductors 214.

The electrostatic circuitry 216 may be configured to control the electrode tip 204 and the electrical connector 208 to capacitively couple with electrodes of a capacitive touch sensor of a device in proximity to the active stylus 200 in order to measure capacitance. In particular, spatial capacitance measurements for the electrode tip 204 and the electrical connector 208 can be localized to particular two-dimensional locations relative to the touch sensor. "Spatial capacitance measurement," as used herein, refers to a measured capacitance between a stylus electrode and a touch-sensing electrode. The measurement is achieved via driving one electrode and interpreting resultant electrical conditions at the other electrode (i.e., drive a stylus electrode and receive at a touch sensor electrode, or drive at a touch sensor electrode and receive at a stylus electrode). Typically, the measurement is localized to a particular two-dimensional location relative to the touch sensor. The two-dimensional location of the spatial capacitance measurement corresponds to the location of the active stylus 200 relative to the touch sensor when a stylus electrode (tip or connector) transmits one or more excitation waveforms that are received by electrodes of the touch sensor, or when the touch sensor electrode transmits one or more excitation waveforms that are received by the active stylus electrodes.

The electrostatic circuitry 216 includes receive circuitry 218 and/or transmit circuitry 220. When included, the receive circuitry 218 is configured to maintain the tip/connector electrodes 204/208 at a constant voltage and convert any current into the tip/connector electrodes 204/208 into a proportional current-sense voltage. The receive circuitry 218 is further configured to digitize the current-sense voltage into digital data to facilitate subsequent processing, such as for position determination, electrostatic communication, etc. The receive circuitry 218 may be configured to receive any suitable waveforms from a device. Such waveforms may communicate any suitable types of information to the active stylus 200. For example, a touch-sensitive device may transmit a synchronization waveform to enable the active stylus 200 to become synchronized with the touch-sensitive device when the active stylus 200 is proximate to touch-sensitive device. Once the active stylus 200 and the touch-sensitive device are time-synchronized, the receive circuitry 218 may interpret a response on either of the electrode tip 204 or the electrical connector 208 to determine a position of the active stylus 200 relative to the touch-sensitive device. For example, such communication may be conducted according to a touch-sensing frame repeatedly performed by the active stylus 200 and the touch-sensitive device.

The transmit circuitry 220 is configured to excite the tip/connector electrodes 204/208 with one or more excitation waveforms such that, when another electrode is sufficiently close, that other electrode's charge is influenced by the drive signal, thereby causing transmission to the proximate device via a capacitive coupling. In some examples, the transmit circuitry 220 transmits the same excitation waveform via the electrode tip 204 and the electrical connector 208. In other examples, the transmit circuitry 220 transmits different excitation waveforms via the electrode tip 204 and the electrical connector 208. The transmit circuitry 220 may be configured to transmit any suitable waveforms that communicate different types of information to, and/or permit sensing at, a device via the electrode tip 204 and/or the electrical connector 208.

In one example, an excitation waveform generated by the transmit circuitry 220 may be a square wave including a sequence of pulses that switch between a lower voltage level (e.g., ground) and a higher voltage level (e.g., supply voltage (Vdd)). In one example, the electrostatic circuitry 216 includes a pull-up switch and a pull-down switch that are alternately controlled to generate a square excitation waveform. In some implementations, the electrostatic circuitry 216 may be configured to control the pull-down switch to drive the output of the electrostatic circuitry 216 to ground (or another reference voltage) when the active stylus 200 is operating in the wired connection mode. In other words, the electrostatic circuitry 216 may be disabled when the active stylus 200 is operating in the wired connection mode. The electrostatic circuitry 216 may be disabled in this manner so as to not generate excitation waveforms that could interfere with operation of the electrical connector 208 when it forms a wired connection with a device, as well as to save power. In other implementations where the electrostatic circuitry 216 is not disabled during wired-mode operation, one or more electrical impedances may be positioned electrically intermediate the electrostatic circuitry 216 and the electrical connector 208. The electrical impedances may reduce a current driven to the electrical connector 208 by the electrostatic circuitry 216 when the electrical connector 208 is shorted to ground, for example in order to protect the electrical connector 208 from an overcurrent condition.

The active stylus 200 includes wired connection circuitry 222 contained within the body 202 and electrically coupled to the electrical connector 208. The wired connection circuitry 222 is configured to control the electrical connector 208 when the active stylus is operating in the wired connection mode, such that the electrical connector 208 forms a suitable wired connection with a device (e.g., plugged into a complementary socket or cable of the device). In particular, the wired connection circuitry 222 is configured to hold the housing 212 of the electrical connector 208 at ground when the active stylus 200 is operating in the wired connection mode. Further, the wired connection circuitry 222 is configured to control the plurality of conductors 214 of the electrical connector 208 to enable the active stylus 200 to perform various operations (e.g., charging, data transfer) with the device when the wired connection is formed.

The wired connection circuitry 222 may be configured to control the plurality of conductors 214 differently based on the type of device to which the active stylus 200 is electrically coupled via the wired connection. For example, when the active stylus 200 is electrically coupled to a computing device, the wired connection circuitry 222 may receive, via the electrical connector 208, one or more data signals from the device. In another example, the wired connection circuitry 222 may transmit, via the electrical connector 208, one or more data signals to the device. Such data signals may communicate information including configuration information, pairing information, updated firmware/software, and/or other information.

In another example, when the active stylus 200 is electrically coupled to a power source, the wired connection circuitry 222 may receive, via the electrical connector 208, charging current from the power source. Furthermore, the wired connection circuitry 222 may provide the charging current to an energy storage device 224 contained within the body 202 and electrically coupled to the wired connection circuitry 222. The energy storage device 224 may take any suitable form. In one example, the energy storage device 224 is a battery—e.g., a lithium ion battery. Alternative examples include super- and ultra-capacitors. In general, the energy storage device 224 may be replaceable and/or rechargeable. In some examples, recharging power may be provided through the electrical connector 208.

In some examples, a device may serve as both a source of data and power for the active stylus 200. In other examples, a device may send/receive data without providing power to the active stylus 200. In still other examples, a device may provide power without sending/receiving data.

In addition to controlling the electrical connector 208, the wired connection circuitry 222 is configured to detect a state of the active stylus 200, and select a mode of operation of the active stylus 200 based on the detected state. In some examples, the wired connection circuitry 222 may switch the active stylus 200 between operation in the wired connection mode and operation in the electrostatic mode based on the detected state. The wired connection circuitry 222 may select the mode of operation based on any suitable state of the active stylus 200.

In some implementations, the wired connection circuitry 222 may select the mode of operation based on a detected mechanical state of the active stylus 200. In the illustrated implementation, the active stylus 200 includes a removable cap 226 configured to interface with the body 202 of the active stylus 200. In particular, the removable cap 226 conceals the electrical connector 208 when the removable cap 226 is installed on the body 202, and exposes the electrical connector when the removable cap 226 is removed from the body 202. The wired connection circuitry 222 includes a cap detection mechanism 228 configured to detect whether the removable cap is installed on the body 202. The cap detection mechanism 228 may include any suitable type of detection mechanism. In one example, the cap detection mechanism 228 includes a Hall effect sensor configured to detect the presence of a magnet incorporated into the removable cap 226. In another example, the cap detection mechanism 228 includes an optical sensor. In still another example, the cap detection mechanism 228 includes a mechanical switch that is toggled when the removable cap 226 is installed or removed.

The wired connection circuitry 222 operates the active stylus 200 in the electrostatic mode when the removable cap is installed on the body, as detected by the cap detection mechanism 228. Note that the removable cap 226 may be made of a material that is suitable to allow excitation waveforms to be emanated through the removable cap 226, so as to allow the active stylus 200 to capacitively couple with a device when operating in the electrostatic mode. Example materials that the cap may be made out of include plastic and rubber.

Furthermore, the wired connection circuitry 222 operates the active stylus in the wired connection mode when the removable cap 226 is removed from the body 202, as detected by the cap detection mechanism 228. In the illustrated implementation, the wireless connection circuitry 222 includes a power switch 230 electrically intermediate the housing 212 of the electrical connector 208 and ground 232. The cap detection mechanism 228 is operatively coupled to the power switch 230 such that the cap detection mechanism 228 controls the state of the power switch 230. In particular, the cap detection mechanism 228 controls the power switch 230 to electrically connect the housing 212 of the electrical connector 208 to ground 232 based on the cap detection mechanism 228 detecting that the removable cap 226 is removed from the body 202 of the active stylus 200. As such, the housing 212 may be maintained at ground 232 while the electrical connector 208 is being used to form a wired connection with a device—i.e., when the removable cap 226 is removed. In one example, the power switch 230 is a low impedance switch that allows for lower-power driver circuitry to be used in the electrostatic circuitry 216, and as a result allows for more power efficient operation of the active stylus 200.

In some implementations, an output of the electrostatic circuitry 216 may be driven to ground based on the cap detection mechanism 228 detecting that the removable cap 226 is removed from the body 202 of the active stylus 200. In other words, the electrostatic circuitry 216 may be disabled based on the removable cap 226 being removed from the body 202. In some implementations, the active stylus may include an additional power switch electrically intermediate the electrostatic circuitry 216 and the electrical connector 208. The additional power switch may isolate the electrostatic circuitry 216 from the electrical connector 208 when the removable cap 226 is removed from the body 202 (or the active stylus is otherwise operating in the wired connection mode). Such a configuration may be employed to save power in the case that the device does not provide power when the active stylus is operating in wired connection mode. Moreover, such a configuration may be employed to reduce signal noise from the electrostatic circuitry 216 when data is being transferred via the electrical connector 208 during operation in the wired connection mode.

Furthermore, the cap detection mechanism 228 controls the power switch 230 to electrically isolate the electrical connector 208 from ground 232 based on the cap detection mechanism 228 detecting that the removable cap 226 is installed on the body 202. When the electrical connector 208 is isolated from ground 232, the electrostatic circuitry 216 may drive the electrical connector 208 with one or more excitation waveforms. According to such a configuration, the removable cap 226 acts as trigger for switching between operation in the wired connection mode and operation in the electrostatic mode.

Any suitable change in mechanical state of the active stylus 200 may trigger a switch in operating modes. In another example, the active stylus may include a physical button that may be toggled to switch operating modes. In still another example, a change in position of the electrical connector may be used to trigger a switch in operating modes. For example, the electrical connector may be configured to move between a retracted position within the body and an exposed position in which the electrical connector extends from the body. When the electrical connector is in the retracted position, the active stylus operates in the electrostatic mode. Further, when the electrical connector is in the extended position, the active stylus operates in the wired connection mode.

In some implementations, the wired connection circuitry 222 may be configured to set the mode of operation of the active stylus 200 based on receiving a signal from a device. For example, the wired connection circuitry 222 may detect a voltage signal (e.g., supply voltage (Vdd)) from the device on a designated power supply conductor of the plurality of conductors 214. In other words, when the power supply pin goes high, it indicates that a wired connection is formed between the electrical connector 208 and a device. This indication may trigger a switch from operation in the electrostatic mode to operation in the wired connection mode. The wired connection circuitry 222 may switch the mode of operation of the active stylus 200 based on receiving any suitable signal from a device.

Figure 3:
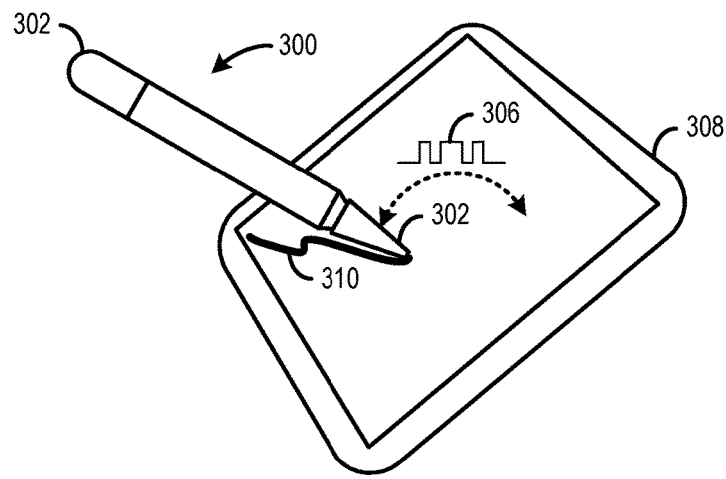
FIG. 3 shows an example scenario in which an active stylus is operating in an electrostatic mode to provide digital inking functionality to a touch-sensitive display device via input from an electrode tip of the active stylus.
Figure 4:
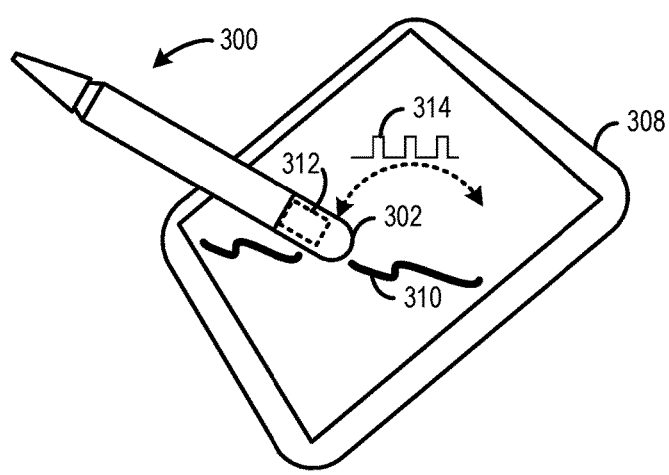
FIG. 4 shows an example scenario in which an active stylus is operating in an electrostatic mode to provide digital erasing functionality to a touch-sensitive display device via input from an electrical connector of the active stylus.

FIGS. 3-6 show example scenarios where an active stylus operates in different modes in which an electrical connector provides different functionality. In FIGS. 3-4, an active stylus 300 is shown operating in an electrostatic mode based on a removable cap 302 being installed on the active stylus 300. In FIG. 3, an electrode tip 304 is driven with a first excitation waveform 306 to form a capacitive coupling with electrodes of a touch-sensitive display device 308. The first excitation waveform 306 influences a capacitance on the electrodes of the touch-sensitive display device 308, and the first excitation waveform 306 is thereby transmitted to the touch-sensitive display device 308. The touch-sensitive display device 308 interprets the first excitation waveform 306, and displays a digital ink trace 310 based on the input from the electrode tip 304. It will be appreciated that a capacitance on the electrode tip 304 may be influenced by excitation waveforms from electrodes of the touch-sensitive display device 308 during this interaction as well.

In FIG. 4, an electrical connector 312 that is concealed by the removable cap 302 is driven with a second, different excitation waveform 314 to form a capacitive coupling with the electrodes of the touch-sensitive display device 308. The second excitation waveform 314 influences a capacitance on the electrodes of the touch-sensitive display device 308, and the second excitation waveform 314 is thereby transmitted to the touch-sensitive display device 308. The touch-sensitive display device 308 interprets the second excitation waveform 314 and differentiates it from the first excitation waveform 306. The touch-sensitive display device 308 erases a portion of the digital ink trace 310 based on the input from the electrical connector 312. It will be appreciated that a capacitance on the electrical connector 312 may be influenced by excitation waveforms from electrodes of the touch-sensitive display device 308 during this interaction as well.

In the scenario illustrated in FIGS. 3-4, when the active stylus 300 is operating in the electrostatic mode, the electrode tip 304 is configured to provide digital inking functionality and the electrical connector 312 functions as an electrostatic electrode that is configured to provide digital eraser functionality.

Figure 5:
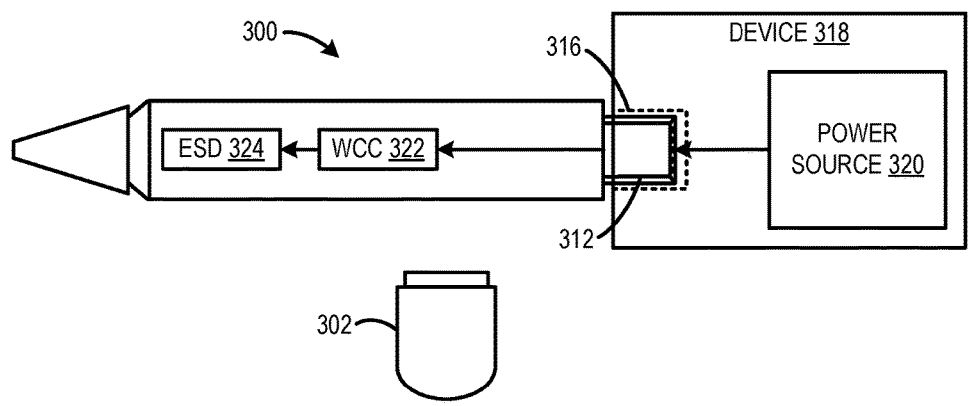
FIG. 5 shows an example scenario in which an active stylus is operating in a wired connection mode where the active stylus is receiving electrical charge from a device via an electrical connector of the active stylus.
Figure 6:
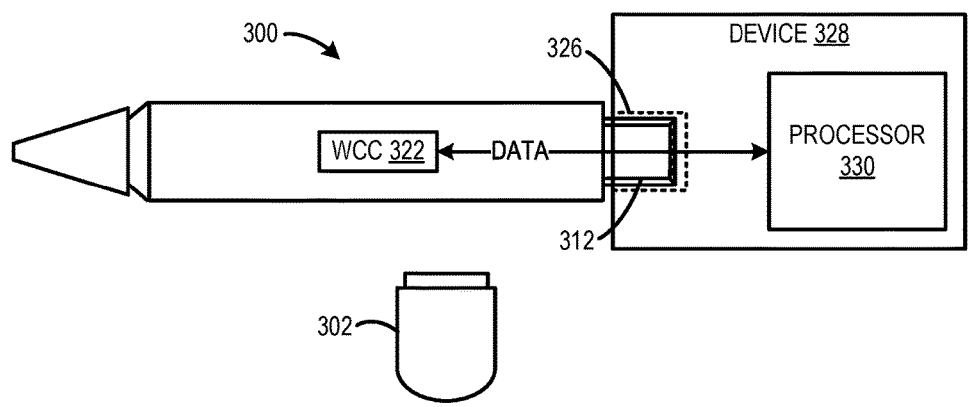
FIG. 6 shows an example scenario in which an active stylus is operating in a wired connection mode where data is transmitted between the active stylus and a device via an electrical connector of the active stylus.

In FIGS. 5-6, the active stylus 300 is shown operating in a wired connection mode based on the removable cap 302 being removed from the active stylus 300. When the active stylus 300 operates in the wired connection mode, a housing of the electrical connector 312 is maintained at ground so that the electrical connector 312 may form a suitable wired connection with a device. In FIG. 5, the electrical connector 312 is plugged into a socket 316 of a device 318 to form a wired connection with the device 318. In this example, the device 318 is a power device, such as an electrical socket, a battery charger, or a computing device. In particular, the device 318 includes a power source 320 configured to provide power to the active stylus 300. When the electrical connector 312 is plugged into the socket 316, wired connection circuitry 322 of the active stylus 300 is configured to receive, via the electrical connector 312, charging current from the power source 320. The wired connection circuitry 322 is further configured to provide the charging current to an energy storage device 324 electrically coupled to the wired connection circuitry 322. Accordingly, the active stylus 300 may be recharged/powered by the device 318, via the wired connection provided by the electrical connector 312.

In FIG. 6, the electrical connector 312 is plugged into a socket 326 of a device 3328 to form a wired connection with the device 328. The wired connection circuitry 322 is configured to receive, via the electrical connector 312, one or more data signals from a processor 330 of the device 328. Further, the wired connection circuitry 322 is configured to transmit, via the electrical connector 312, one or more data signals to the processor 330 of the device 328. Accordingly, data communication may be enabled between the active stylus 300 and the device 328, via the wired connection provided by the electrical connector 312.

In an example, an active stylus comprises a body, an electrical connector operatively coupled to the body and configured to electrically couple the active stylus with a device via a wired connection, wired connection circuitry contained within the body and electrically coupled to the electrical connector and configured to hold at least a portion of the electrical connector at ground when the active stylus operating in a wired connection mode, and electrostatic circuitry contained within the body and electrically coupled to the electrical connector and configured to transmit or receive, via the electrical connector, one or more excitation waveforms when the active stylus is operating in an electrostatic mode. In this example and/or other examples, the active stylus may further comprise an energy storage device contained within the body and electrically coupled to the wired connection circuitry, and the wired connection circuitry may be configured to, when the electrical connector is electrically coupled to the device and when the active stylus is operating in the wired connection mode, receive, via the electrical connector, charging current from the device and provide the charging current to the energy storage device. In this example and/or other examples, the wired connection circuitry may be configured to, when the electrical connector is electrically coupled to the device and when the active stylus is operating in the wired connection mode, receive, via the electrical connector, one or more data signals from the device and/or transmit, via the electrical connector, one or more data signals to the device. In this example and/or other examples, an output of the electrostatic circuitry may be driven to ground when the active stylus is operating in the wired connection mode. In this example and/or other examples, the electrical connector may include a conductive housing and a plurality of conductors contained within the conductive housing, and the wired connection circuitry may be configured to hold the conductive housing at ground when the active stylus is operating in the wired connection mode. In this example and/or other examples, the electrostatic circuitry may be electrically coupled to the conductive housing and configured to transmit or receive, via the conductive housing, the one or more excitation waveforms when the active stylus is operating in the electrostatic mode. In this example and/or other examples, the wired connection circuitry may be configured to set the active stylus to operation in the wired connection mode and hold the conductive housing at ground based on detecting a voltage signal from the device on a power supply conductor of the plurality of conductors. In this example and/or other examples, the wired connection circuitry may be configured to detect a mechanical state of the active stylus and switch the active stylus between operation in the wired connection mode and operation in the electrostatic mode based on the detected mechanical state of the active stylus. In this example and/or other examples, the active stylus may further comprises a removable cap configured to conceal the electrical connector when the removable cap is installed on the body of the active stylus, and expose the electrical connector when the removable cap is removed from the body of the active stylus, and the wired connection circuitry may be configured to detect whether the removable cap is installed on the body, operate the active stylus in the electrostatic mode when the removable cap is installed on the body, and operate the active stylus in the wired connection mode when the removable cap is removed from the body. In this example and/or other examples, the active stylus, may further comprise a power switch electrically intermediate the electrical connector and ground, and the wired connection circuitry may be configured to control the power switch to electrically connect the electrical connector to ground when the active stylus is operating in the wired connection mode and electrically isolate the electrical connector from ground when the active stylus is operating in the electrostatic mode. In this example and/or other examples, the active stylus may further comprise an electrode tip operatively coupled to a first end of the body and electrically coupled to the electrostatic circuitry, the electrical connector may be operatively coupled to a second, opposing end of the body, and the electrostatic circuitry may be configured to transmit, via the electrode tip, one or more excitation waveforms when the active stylus is operating in the electrostatic mode. In this example and/or other examples, when the active stylus is operating in the electrostatic mode, the electrode tip may be configured to provide digital inking functionality and the electrical connector may be configured to provide digital erasing functionality.

In an example, an active stylus comprises a body including a first end and a second end that opposes the first end, an electrode tip operatively coupled to the first end of the body, an electrical connector operatively coupled to the second end of the body and configured to electrically couple the active stylus with a device via a wired connection, wired connection circuitry contained within the body and electrically coupled to the electrical connector and configured to hold at least a portion of the electrical connector at ground when the active stylus is operating in a wired connection mode, and electrostatic circuitry contained within the body and electrically coupled to the electrode tip and the electrical connector, the electrostatic circuitry being configured to transmit, via the electrode tip, one or more excitation waveforms when the active stylus is operating in an electrostatic mode, and transmit, via the electrical connector, one or more excitation waveforms when the active stylus is operating in the electrostatic mode. In this example and/or other examples, the active stylus may further comprises an energy storage device contained within the body and electrically coupled to the wired connection circuitry, and the wired connection circuitry may be configured to, when the electrical connector is electrically coupled to the device and when the active stylus is operating in the wired connection mode, receive, via the electrical connector, charging current from the device and provide the charging current to the energy storage device. In this example and/or other examples, the wired connection circuitry may be configured to, when the electrical connector is electrically coupled to the device and when the active stylus is operating in the wired connection mode, receive, via the electrical connector, one or more data signals from the device and/or transmit, via the electrical connector, one or more data signals to the device. In this example and/or other examples, an output of the electrostatic circuitry may be driven to ground when the active stylus is operating in the wired connection mode. In this example and/or other examples, the wired connection circuitry may be configured to detect a mechanical state of the active stylus and switch the active stylus between operation in the wired connection mode and operation in the electrostatic mode based on the detected mechanical state of the active stylus. In this example and/or other examples, the active stylus may further comprise a removable cap configured to conceal the electrical connector when the removable cap is installed on the body of the active stylus, and expose the electrical connector when the removable cap is removed from the body of the active stylus, and the wired connection circuitry may be configured to detect whether the removable cap is installed on the body, operate the active stylus in the electrostatic mode when the removable cap is installed on the body, and operate the active stylus in the wired connection mode when the removable cap is removed from the body. In this example and/or other examples, the active stylus may further comprise a power switch electrically intermediate the electrical connector and ground, and the wired connection circuitry may be configured to control the power switch to electrically connect the electrical connector to ground when the active stylus is operating in the wired connection mode and electrically isolate the electrical connector from ground when the active stylus is operating in the electrostatic mode.

In an example, an active stylus comprises a body, an electrical connector operatively coupled to the body and configured to electrically couple the active stylus with a device via a wired connection, a removable cap configured to conceal the electrical connector when the removable cap is installed on the body and expose the electrical connector when the removable cap is removed from the body, a power switch electrically intermediate the electrical connector and ground, wired connection circuitry contained within the body and electrically coupled to the electrical connector and the power switch, the wired connection circuitry configured to control the power switch to electrically connect the electrical connector to ground if the removable cap is installed on the body, and control the power switch to electrically isolate the electrical connector from ground if the removable cap is removed from the body, and electrostatic circuitry contained within the body and electrically coupled to the electrical connector and configured to transmit, via the electrical connector, one or more excitation waveforms based on the power switch being controlled to electrically isolate the electrical connector from ground.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An active stylus comprising:
   a body;
   an electrical connector operatively coupled to the body and configured to electrically couple the active stylus with a device via a wired connection;
   wired connection circuitry contained within the body and electrically coupled to the electrical connector and configured to hold at least a portion of the electrical connector at ground when the active stylus operating in a wired connection mode; and
   electrostatic circuitry contained within the body and electrically coupled to the electrical connector and configured to transmit or receive, via the electrical connector, one or more excitation waveforms when the active stylus is operating in an electrostatic mode.

2. The active stylus of claim 1, further comprising:
   an energy storage device contained within the body and electrically coupled to the wired connection circuitry, and
   wherein the wired connection circuitry is configured to, when the electrical connector is electrically coupled to the device and when the active stylus is operating in the wired connection mode, receive, via the electrical connector, charging current from the device and provide the charging current to the energy storage device.

3. The active stylus of claim 1, wherein the wired connection circuitry is configured to, when the electrical connector is electrically coupled to the device and when the active stylus is operating in the wired connection mode, at least one of receive, via the electrical connector, a first data signal from the device and transmit, via the electrical connector, a second data signal to the device.

4. The active stylus of claim 1, wherein an output of the electrostatic circuitry is driven to ground when the active stylus is operating in the wired connection mode.

5. The active stylus of claim 1, wherein the electrical connector includes a conductive housing and a plurality of conductors contained within the conductive housing, and wherein the wired connection circuitry is configured to hold the conductive housing at ground when the active stylus is operating in the wired connection mode.

6. The active stylus of claim 5, wherein the electrostatic circuitry is electrically coupled to the conductive housing and configured to transmit or receive, via the conductive housing, the one or more excitation waveforms when the active stylus is operating in the electrostatic mode.

7. The active stylus of claim 5, wherein the wired connection circuitry is configured to set the active stylus to operation in the wired connection mode and hold the conductive housing at ground based on detecting a voltage signal from the device on a power supply conductor of the plurality of conductors.

8. The active stylus of claim 1, wherein the wired connection circuitry is configured to detect a mechanical state of the active stylus and switch the active stylus between operation in the wired connection mode and operation in the electrostatic mode based on the detected mechanical state of the active stylus.

9. The active stylus of claim 8, further comprising:
   a removable cap configured to conceal the electrical connector when the removable cap is installed on the body of the active stylus, and expose the electrical connector when the removable cap is removed from the body of the active stylus; and wherein the wired connection circuitry is configured to detect whether the removable cap is installed on the body, operate the active stylus in the electrostatic mode when the removable cap is installed on the body, and operate the active stylus in the wired connection mode when the removable cap is removed from the body.

10. The active stylus of claim 8, further comprising:

a power switch electrically intermediate the electrical connector and ground; and wherein the wired connection circuitry is configured to control the power switch to electrically connect the electrical connector to ground when the active stylus is operating in the wired connection mode and electrically isolate the electrical connector from ground when the active stylus is operating in the electrostatic mode.

11. The active stylus of claim 1, further comprising:

an electrode tip operatively coupled to a first end of the body and electrically coupled to the electrostatic circuitry, wherein the electrical connector is operatively coupled to a second, opposing end of the body, and wherein the electrostatic circuitry is configured to transmit, via the electrode tip, one or more excitation waveforms when the active stylus is operating in the electrostatic mode.

12. The active stylus of claim 11, wherein, when the active stylus is operating in the electrostatic mode, the electrode tip is configured to provide digital inking functionality and the electrical connector is configured to provide digital erasing functionality.

13. An active stylus comprising:

a body including a first end and a second end that opposes the first end;

an electrode tip operatively coupled to the first end of the body;

an electrical connector operatively coupled to the second end of the body and configured to electrically couple the active stylus with a device via a wired connection;

wired connection circuitry contained within the body and electrically coupled to the electrical connector and configured to hold at least a portion of the electrical connector at ground when the active stylus is operating in a wired connection mode; and electrostatic circuitry contained within the body and electrically coupled to the electrode tip and the electrical connector, the electrostatic circuitry being configured to transmit, via the electrode tip, one or more excitation waveforms when the active stylus is operating in an electrostatic mode, and transmit, via the electrical connector, one or more excitation waveforms when the active stylus is operating in the electrostatic mode.

14. The active stylus of claim 13, further comprising:

an energy storage device contained within the body and electrically coupled to the wired connection circuitry, and wherein the wired connection circuitry is configured to, when the electrical connector is electrically coupled to the device and when the active stylus is operating in the wired connection mode, receive, via the electrical connector, charging current from the device and provide the charging current to the energy storage device.

15. The active stylus of claim 13, wherein the wired connection circuitry is configured to, when the electrical connector is electrically coupled to the device and when the active stylus is operating in the wired connection mode, at least one of receive, via the electrical connector, a first data signal from the device and transmit, via the electrical connector, a second data signal to the device.

16. The active stylus of claim 13, wherein an output of the electrostatic circuitry is driven to ground when the active stylus is operating in the wired connection mode.

17. The active stylus of claim 13, wherein the wired connection circuitry is configured to detect a mechanical state of the active stylus and switch the active stylus between operation in the wired connection mode and operation in the electrostatic mode based on the detected mechanical state of the active stylus.

18. The active stylus of claim 17, further comprising:

a removable cap configured to conceal the electrical connector when the removable cap is installed on the body of the active stylus, and expose the electrical connector when the removable cap is removed from the body of the active stylus; and wherein the wired connection circuitry is configured to detect whether the removable cap is installed on the body, operate the active stylus in the electrostatic mode when the removable cap is installed on the body, and operate the active stylus in the wired connection mode when the removable cap is removed from the body.

19. The active stylus of claim 17, further comprising:

a power switch electrically intermediate the electrical connector and ground; and wherein the wired connection circuitry is configured to control the power switch to electrically connect the electrical connector to ground when the active stylus is operating in the wired connection mode and electrically isolate the electrical connector from ground when the active stylus is operating in the electrostatic mode.

20. An active stylus comprising:

a body;

an electrical connector operatively coupled to the body and configured to electrically couple the active stylus with a device via a wired connection;

a removable cap configured to conceal the electrical connector when the removable cap is installed on the body and expose the electrical connector when the removable cap is removed from the body;

a power switch electrically intermediate the electrical connector and ground;

wired connection circuitry contained within the body and electrically coupled to the electrical connector and the power switch, the wired connection circuitry configured to control the power switch to electrically connect the electrical connector to ground if the removable cap is installed on the body, and control the power switch to electrically isolate the electrical connector from ground if the removable cap is removed from the body; and electrostatic circuitry contained within the body and electrically coupled to the electrical connector and configured to transmit, via the electrical connector, one or more excitation waveforms based on the power switch being controlled to electrically isolate the electrical connector from ground.

* * * * *